3,555,040
Patented Jan. 12, 1971

3,555,040
2-HALOGENO-BENZIMIDAZOLE DERIVATIVES

Wilhelm Ernst Frick, Pfeffingen, Basel-Land, and Thomas Wenger, Riehen, Switzerland, assignors to Geigy Chemical Corporation, Ardsley, N.Y., a corporation of New York
No Drawing. Filed Aug. 4, 1966, Ser. No. 570,184
Claims priority, application Switzerland, Aug. 16, 1965, 11,111/65
Int. Cl. C07d 49/38
U.S. Cl. 260—309.2          3 Claims

ABSTRACT OF THE DISCLOSURE 2-halogeno-benzimidazole derivatives having the structure

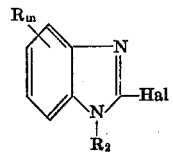

in which Hal is fluorine, chlorine or bromine, R is halogen, lower alkyl, lower alkoxy, trifluoromethyl, lower alkylamino, or other substituents, $R_2$ is hydrogen or a metal cation, and $m$ is an integer from 2 to 4, are useful for the control of keratin-devouring insects. A sub-class of these derivatives in which $m$ is at most 3 and which additionally contain on the phenyl ring a substituent selected from among certain benzoylamino, benzenesulfonylamino or alkylsulfonylamino groups are new compounds.

DETAILED DISCLOSURE

The present invention concerns insecticidal and acaricidal agents which contain 2-halogeno-benzimidazole derivatives as active substances, new 2-halogeno-benzimidazole compounds, as well as the use of these active substances and agents containing them for combatting keratin-devouring insects and, preferably, for the protection of material containing keratin from injury by insects.

Benzimidazole derivatives carrying a low molecular halogen alkyl radical in the 2 position, which are optionally substituted in the benzene nucleus by one or more chlorine or bromine atoms, nitro, cyano, amino and alkylamino groups, are already known (Dutch application 64/10,413) to be useful as herbicidal and pesticidal active substances for combatting weeds, insects, nematodes and mites. These 2-halogenoalkyl benzimidazoles, however, are relatively difficult to produce on a technical scale.

It has now been found that 2-halogeno-benzimidazole derivatives of the general formula

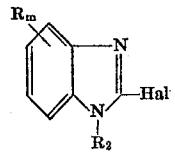

wherein

Hal represents a halogen atom having an atomic weight of below 100, particularly chlorine or bromine, R represents a halogen atom, particularly chlorine or bromine, a nitro, hydroxyl or thiol group, an alkyl, alkoxy or alkylthio radical having up to 6 C atoms, a trifluoromethyl group, an amino group mono- or disubstituted by low alkyl radicals, the benzoylamino group or a benzoylamino group substituted in the benzene nucleus by halogen or trifluoromethyl groups, the benzenesulfonamido group or a benzenesulfonamido group substituted in the benzene nucleus by halogen, trifluoromethyl or halogen and trifluoromethyl together, an alkylsulfonylamino group, an alkylsulfinyl or alkylsulfonyl radical or the radical of sulfonic acid and its salt, ester and amide forms, $R_2$ represents hydrogen or a metal cation, and $m$ represents an integer of from 2 to 4, have excellent activity against insects and their stages of development, such as moth larvae and also fur and carpet beetle larvae, which injure keratin material. Due to their affinity to keratin fibers, the 2-halogeno-benzimidazole derivatives of general Formula I draw onto these fibers from aqueous dispersions and, if $R_2$ is hydrogen, also from aqueous solutions of their salts, and, in this way, the keratin material treated therewith is protected from injury caused by the larvae of clothes moths and other moths as well as that caused by larvae of fur and carpet beetles (Anthrenus and Attagenus).

The compounds of the general Formula I are also active for the protection of organic materials such as paper, wood, textiles, synthetic materials, etc. against attack by keratin-devouring insects.

Those active substances of the general Formula I wherein several (up to 4) radicals R are chlorine atoms are of particular interest.

Preferred active substances of general Formula I are those in which there is more than one R present. If there is only one R, then this should be in the 4- or 7-position. If there are several chlorine atoms as substituents R, two of them should preferably be in the 4- and 7-position. As sulfonic acid amide groups R, chiefly those derived from alkylamines, arylamines, alkenylamines and chloralkenylamines are used.

In part the compounds embraced by general Formula I are known substances, e.g. 2-chlorobenzimidazoles chlorinated in the nucleus.

New 2 - halogeno-benzimidazoles of the general Formula II

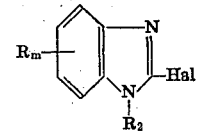

wherein

R, $R_2$ and Hal have the meanings given in Formula I, and $m$ represents a number of from 2 to 4, whereby, however, at least one of the radicals R present in compounds of Formula II does not represent halogen, or an alkyl, alkoxy or trifluoromethyl radical, nitro, amino, monoalkylamino or dialkylamino, are prepared according to the invention, by reacting a 2-hydroxy-benzimidazole of the general Formula III

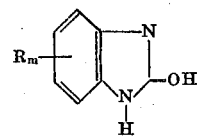

wherein R and $m$ have the meanings given above, with phosphorus oxychloride ($POCl_3$) or phosphorus oxybromide ($POBr_3$), optionally in the presence of hydrochloric or hydrobromic acid and, if desired, transforming the 2-halogeno-benzimidazoles so obtained into their salts.

This reaction is analogous to known processes. Similar processes are described in Helv. chim. acta 44, 1278

(1961), J. Chem. Soc. 2934 (1963) and Gazz. chim, ital. 88, 13 (1958).

New 2-halogeno-benzimidazole compounds have the following structure:

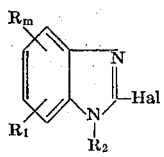

in which

R is halogen, nitro, alkyl of up to 6 carbon atoms, alkoxy of up to 6 carbon atoms, trifluoromethyl, or lower alkyl substituted amino, $R_1'$ is benzoylamino, halogeno-benzoylamino, trifluoromethyl-benzoylamino, benzenesulfonylamino, halogeno benzenesulfonylamino, or alkylsulfonylamino, $R_2$ is hydrogen or a metal cation, Hal is halogen with an atomic number of at most 35, and $m$ is an integer of from 1 to 3.

In a modification of the process according to the invention, 2 mercapto-benzimidazoles of the general Formula V

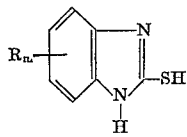

wherein R and $m$ have the meanings given in Formula II, are used as starting materials. The new 2-halogeno-benzimidazole according to the invention are then obtained by:

(a) oxidizing such starting materials with potassium permanganate to form the corresponding 2-sulfonic acid derivative and reacting this with phosphorus pentachloride or phosphorus oxychloride to form the instable sulfonic acid chloride which decomposes into the corresponding 2-chlorobenzimidazole [Annalen der Chemie 647, 5–7, (1961) describe similar reactions], or (b) treating such starting materials with chlorine in the presence of water and, if desired, another solvent and, if desired, transforming the 2-halogen-benzimidazoles obtained according to (a) or (b) into their salts. [Similar reactions are described in J. Am. Chem. Soc. 72, 4890 (1950)]. Carbon tetrachloride and, particularly, glacial acetic acid are used e.g. as solvents for this reaction.

The production of the 2-hydroxy-benzimidazoles of Formula III used as starting materials in the process according to the invention is described in Helv. chim. acta 44, 1278 (1961), J. Chem. Soc. 2934 (1963) and Gazz. chim. ital. 88, 13 (1958).

When the oxidative chlorination of nuclear unsubstituted 2-mercapto-benzimidazole is performed in acetic acid at room temperature for a longer time (5 hours), then, with simultaneous chlorination of the nucleus, a mixture of 2,5,6-trichloro-benzimidazole and 2,5,6,7-tetrachloro-benzimidazole is formed [Knobloch and Rintelen, Archiv. der Pharmazie 291 (63. Vol.) pages 180–184 (1958)].

The production of amino benzimidazoles is carried out by reducing the corresponding nitro benzimidazoles which in turn can be produced according to the above-described processes. The so-obtained amino benzimidazoles can be reacted, for instance, with carboxylic acid chloride or sulfonic acid chlorides to the corresponding amides. The so-obtained carbamido benzimidazoles or sulfamido benzimidazoles may be further substituted by halogen.

The 2-mercapto-benzimidazoles of general Formula IV which can be used as starting materials in the modified process according to the invention, can be obtained by known processes, e.g. by reacting correspondingly substituted o-phenylenediamines with carbon disulfide, thiophosgene or thiourea. The o-phenylenediamines necessary for these reactions can be produced according to known processes.

The 2-hydroxy-benzimidazoles of general Formula III which can be used as starting materials in the modified process according to the invention, can be obtained by known processes, e.g. by reacting correspondingly substituted o-phenylenediamines with phosgene or urea. The o-phenylenediamines necessary for these reactions can be produced according to known processes.

The following examples illustrate the production of 2-halogeno-benzimidazoles of the general Formula II. Where not otherwise stated, parts are given by weight and the temperatures are given in degrees centigrade.

EXAMPLE 1

2,4,5,6,7-pentachloro benzimidazole 14 g. of 2-mercapto-4,5,6,7-tetrachloro benzimidazole [produced by condensation of tetrachloro-o-phenylenediamine with carbon disulfide, thiocarbonyl chloride or thiourea] are dissolved in 300 parts by volume of glacial acetic acid to which 25 parts by volume of concentrated hydrochloric acid and 2 drops of concentrated nitric acid have been added. 15 to 20 parts of chlorine are passed into the mixture at 15 to 20°. After about half of the chlorine has been introduced, an almost clear solution is obtained. On further introduction of chlorine, gradually a thick paste is formed. 500 parts of water are added to the paste and the mixture is adjusted to a pH of 6 with solid sodium acetate. Thereby the product precipitates almost completely. The product is filtered off by suction, washed with water and dried. This product can be used in its crude form as component of agents for the protection of keratin-containing material.

On recrystallization from methanol, pure 2,4,5,6,7-pentachloro benzimidazole is obtained having a melting point of 283–285° (with decomposition).

The following compounds can be produced analogously: 2,5,6-trichloro-benzimidazole, from 2-mercapto-5,6-dichloro-benzimidazole; M.P. 218–220°, with decomposition; and 2,4,5,7-tetrachloro-benzimidazole, from 2-mercapto-4,5,7-trichlorobenzimidazole; M.P. 255–258°, with decomposition.

EXAMPLE 2

2-bromo-4,6,7-tribromo-5-chloroimidazole 18.4 parts of 2-mercapto-5-chloro-imidazole are suspended in 3000 parts by volume of water of 80° while stirring; then 25 parts by volume of concentrated sulfuric acid are added. 43 parts by volume of bromine and a solution of 67 parts of potassium bromate in 500 parts by volume of water are added gradually. The mixture is stirred and boiled under reflux for 24 hours. After excess bromine has been removed by distillation, the product is filtered off by suction and suspended in concentrated ammonia. The mixture is made strongly alkaline by the addition of 2 N NaOH and the insoluble parts filtered off. The filtrate is adjusted to a pH of about 9 to 10 and the precipitate filtered off by suction and recrystallized from alcohol. The melting point is 278–279°.

EXAMPLE 3

2-chloro-5-amino benzimidazole hydrochloride 98.8 g. of 2-chloro-5-nitro benzimidazole are dissolved in 2500 ml. of concentrated hydrochloric acid and 188.8 g. of granulated tin is added gradually at 20 to 25°. The mixture is stirred at 20 to 25° for 24 hours and saturated with gaseous hydrochloric acid under cooling with ice. Stirring is continued at room temperature for another 60 hours. The precipitate is filtered off by suction, dissolved in 4.5 l. of water and the product precipitated by means of hydrogen sulfide. The precipitate is filtered off and the filtrate concentrated in a rotary evaporator at a maximum temperature of 40°. The precipitated white substance is filtered off by suction and dried over NaOH at 20 to 25°. The yield is 53.3 g.

*Analysis.*—Calc'd (percent) C, 34.95; H, 3.35; Cl, 44.23; N, 17.47. Found (percent): C, 34.5; H, 3.3; Cl, 43.3; N, 17.3.

EXAMPLE 4

2-chloro-5-[4′-chlorophenylsulfonylamino]-benzimidazole 24 g. of 2-chloro-5-amino benzimidazole hydrochloride are added to 500 ml. of chloroform and 25 g. of p-chlorophenyl sulfonyl chloride dissolved in 500 ml. of chloroform are admixed thereto. 40 ml. of water are added and 47 ml. of triethylamine are added dropwise. The mixture is stirred at 20 to 25° for 12 hours, refluxed for another hour, and concentrated in a rotary evaporator. The residue is dissolved in ethanol, 1000 ml. of ether added and the resulting ethereal solution purified by washing with 100 ml. of diluted hydrochloric acid. The ether phase is extracted with 1 N NaOH, the aqueous NaOH acidified with concentrated hydrochloric acid and the precipitate again extracted with ether. The ether extract is dried and evaporated in a rotary evaporator. 25 g. of partly solidified oil is obtained. The residue is dissolved in hot ethanol, 400 ml. of chlorobenzene are added and the ethanol distilled off. A coarse grained substance precipitates. The chlorobenzene solution is decanted while still hot. The residue is dried in a vacuum at 80°. Yield 14.3 g.; M.P. 219–221°, with decomposition.

*Analysis.*—Calc'd (percent): C, 45.62, H, 2.65; Cl, 20.73; N, 12.28; O, 9.35; S, 9.37. Found (percent): C, 46.1; H, 2.7; Cl, 20.5; N, 11.9; O, 9.8; S, 9.6.

EXAMPLE 5

2-chloro-4,6,7-trichloro-5-[4′-chlorophenyl-sulfonylamino] benzimidazole 10.2 g. of 2-chloro-5-[4′-chlorophenylsulfonylamino] benzimidazole are dissolved in 100 ml. of dimethylformamide and 0.2 g. of ferric chloride added thereto. 7 g. of chlorine dissolved in carbon tetrachloride are added dropwise at 20 to 30° within 2 hours. The mixture is stirred at room temperature for 12 hours and the carbon tetrachloride removed in a rotary evaporator. The residue is dropped onto a mixture of ice and water, concentrated NaOH is added until all substance is dissolved, the solution is filtered and the filtrate acidified with concentrated hydrochloric acid. The precipitate is filtered off by suction and washed with water until the filtrate has a neutral reaction. The precipitate is dried in a vacuum at 70°. Yield: 11.4 g.; M.P. 125–145°.

*Analysis.*—Calc'd (percent): C, 34.85; H, 1.39; Cl, 39.57; N, 9.38; O, 8.04; S, 7.16. Found (percent): C, 34.91; H, 1.54; Cl, 39.71; N, 9.71; O, 8.21; S, 6.95.

The following compounds of Formula I can be produced as described in the foregoing examples:

TABLE 1

| Number: | Compound | M.P.,° C. |
|---|---|---|
| 1 | 2-chloro-4,7-dibromo-benzimidazole | 201–203 |
| 2 | 2,5-dichloro-4,7-dibromo-benzimidazole | 237–241 |
| 3 | 2,5-dichloro-4,6,7-tribromo-benzimidazole | 270–272 |
| 4 | 2,6-dichloro-5-trifluoromethyl-benzimidazole | 180–182 |
| 5 | 2,4,6-trichloro-5,7-dibromo-benzimidazole | 282–283 |
| 6 | 2,5,6-trichloro-benzimidazole | [1] 218–220 |
| 7 | 2,5,6-trichloro-4,7-dibromo-benzimidazole | 276–277 |
| 8 | 2,5,6-trichloro-4,7-dimethyl-benzimidazole | 247–249 |
| 9 | 2,4,5,6-tetrachloro-benzimidazole | [1] 234 |
| 10 | 2,4,5,6-tetrachloro-7-bromo-benzimidazole | 282–283 |
| 11 | 2,5,6,7-tetrachloro-4-methyl-benzimidazole | 265 |
| 12 | 2,4,5,7-tetrachloro-benzimidazole | [1] 255–258 |
| 13 | 2,4,5,7-tetrachloro-6-methoxy-benzimidazole | 215–217 |
| 14 | 2,6-dibromo-4,5,7-trichloro-benzimidazole | 292–295 |
| 15 | 2,7-dibromo-4,5,6-trichloro-benzimidazole | [1] 287 |
| 16 | 2,7-dibromo-5-trifluoromethyl-6-chlorobenzimidazole | [1] 136 |
| 17 | 2,4,7-tribromo-5,6-dichloro-benzimidazole | 278–279 |
| 18 | 2,5,7-tribromo-4,6-dichloro-benzimidazole | 290–291 |
| 19 | 2,4,6,7-tetrabromo-5-chloro-benzimidazole | 278–279 |
| 20 | 2,4,5,6,7-pentachloro-benzimidazole | [1] 283–285 |
| 21 | 2,4,5,6,7-pentabromo-benzimidazole | 294–295 |
| 22 | Chlorinated 2-chloro-benzimidazole [2] | >240 |
| 23 | 2,6-dichloro-5-methylsulfonylamino-benzimidazole | ---- |
| 24 | 2,4,6-trichloro-5-methylsulfonylaminobenzimidazole | ---- |
| 25 | 2,4,6-trichloro-5-(4′-chloro-phenylsulfonylamino)-benzimidazole | [1] >190 |
| 26 | 2-chloro-4,6,7-tribromo-5-methylsulfonylamino-benzimidazole | ---- |
| 27 | 2-chloro-5-(3′trifluoromethyl-4′-chlorophenylsulfonylamino)-benzimidazole | 188–191 |
| 28 | 2,4,6,7-tetrachloro-5-(4′-chlorophenylsulfonylamino)-benzimidazole | [1] >135 |
| 29 | 2-chloro-5-(3′,4′-dichlorobenzoylamino)-benzimidazole | 214–215 |
| 30 | 2-chloro-5-(2′,4′,5′-trichlorobenzoylamino)-benzimidazole | [1] 283 |
| 31 | 2,4-dichloro-5-(3′,4′-dichlorobenzoylamino)-benzimidazole | ---- |
| 32 | 2,6-dichloro-5-(2′,4′,5′-trichlorobenzoylamino)-benzimidazole | ---- |
| 33 | Mixture of 70% 2,4,6,7-tetrachloro- and 30% 2,4,6-trichloro-5-(3′,4′-dichlorobenzoylamino)-benzimidazole. | [1] >170 |
| 34 | 2-chloro-5-(3′-trifluoromethyl-4′-chlorophenylcarbamoyl)-benzimidazole | 140 |
| 35 | 2,4,6-trichloro-5-(4′-chlorophenylsulfamoyl)-benzimidazole | 223–225 |
| 36 | 2,4,6-trichloro-5-[3′,4′-dichloro-(N-methyl)-phenylsulfamoyl]-benzimidazole | [1] >210 |

[1] Decomposition.  [2] 58.1% Cl.

EXAMPLE 6

To a solution of 2.9 parts of 2,4,5,6,7-pentachlorobenzimidazole in 40 parts by volume of warm methanol, a solution of 3.2 parts of barium hydroxide in 150 parts by volume of warm water is added, while stirring. Undissolved particles are filtered off and the filtrate is evaporated to dryness. The barium salt of 2,4,5,6,7-pentachlorobenzimidazole obtained melts at >317° (with decomposition).

If, instead of the 3.2 parts of barium hydroxide, 0.4 parts of magnesium oxide are used and the combined solutions are heated to 70–80° for 10 minutes, then with otherwise the same procedure the magnesium salt of 2,4,5,6,7-pentachlorobenzimidazole is obtained, M.P. >321° (with decomposition).

The activity of 2-halogen-benzimidazole derivatives of general Formula I against insects which injure keratin material was tested as given below:

Test methods and results

A 0.5% stock solution of each active substance to be tested in ethylene glycol monomethyl ether (methyl Cellosolve) is prepared. Then an aqueous application liquor was prepared at room temperature which contains 20 ml. of the stock solution mentioned (0.1 g. of active substance) in 400 ml. liquor. 10 g. of wool flannel are then well wetted with hot water and introduced into the liquor at room temperature. While constantly circulating the woollen sample, the bath temperature is raised to 60° C. with 15 minutes, then 2% of 80% formic acid (calculated on the weight of the wool) are added and the treatment in the liquor is continued for another 30 minutes at this temperature. It is then cooled, the woollen sample is rinsed in running tap water, centrifuged and, for the purpose of drying, is hung up. The concentration of active substance is 1%, calculated on the weight of the wool.

The sample so dried is then subjected to the moth proofing test (injury by clothes moth *Tineola biselliella*) according to the Swiss Association for Standardisation leaflet 95901 and also it is tested for fastness to the fur beetle larvae (*Attagenus piceus*) and carpet beetle larvae (*Anthrenus vorax*) according to Swiss Association for Standardisation leaflet 95902; the method for Anthrenus larvae was simply applied to Attagenus piceus larvae in that 6–7 week old larvae of the latter type were used for the test. In principle, the method consists in cutting four equal sized pieces from the treated wool flannel sample and exposing each of these pieces for 14 days at a constant temperature (28° C.) and constant relative humidity (65%), to the attack (voracity) of 15 larvae of the relative pest (two pieces of material with the same pest).

They can be applied to the keratin material direct from these aqueous solutions, either by dipping the material for a shorter or longer time in the alkali metal salt solutions, or spraying them with the solutions, or by treating them in the solutions at a raised temperature as in dyeing processes.

Because of their solubility in organic solvents, these compounds are also particularly well suited for application from non-aqueous media. Thus, the materials to be protected can simply be impregnated with these solutions, or if a suitable solvent is chosen, the moth proof finishing can be combined with a dry cleaning process.

Propylene glycol, methoxyethanol, ethoxyethanol and dimethyl formamide have proved to be particularly suitable organic solvents, to which can be added distributing agents and/or other auxiliaries such as sodium hydroxide. Emulsifying agents such as sulfated ricinus oil, sulfite waste liquor and fatty alcohol sulfates are particularly mentioned as distributing agents.

Agents according to the invention for combating insect larvae which injure keratin material and the use of these agents for the protection of keratin materials

| Compound Number: | Moths | Attagenus | Anthrenus |
|---|---|---|---|
| 1 ........ 2-chloro-4,7-dibromo-benzimidazole | **** | **** | **** |
| 2 ........ 2,5-dichloro-4,7-dibromo-benzimidazole | **** | **** | **** |
| 3 ........ 2,5-dichloro-4,6,7-tribromo-benzimidazole | **** | **** | **** |
| 4 ........ 2,4,6-trichloro-5,7-dibromo-benzimidazole | **** | **** | **** |
| 5 ........ 2,4,5-trichloro-4,7-dibromo-benzimidazole | **** | **** | **** |
| 6 ........ 2,4,5,6-tetrachloro-7-bromo-benzimidazole | **** | **** | **** |
| 7 ........ 2,4,5,7-tetrachloro-6-methoxy-benzimidazole | **** | **** | **** |
| 8 ........ 2,5,6,7-tetrachloro-4-methyl-benzimidazole | **** | **** | **** |
| 9 ........ 2,6-dibromo-4,5,7-trichloro-benzimidazole | **** | **** | **** |
| 10 ....... 2,7-dibromo-4,5,6-trichloro-benzimidazole | **** | **** | **** |
| 11 ....... 2,x-dibromo-5-trifluoromethyl-6-chlorobenzimidazole | **** | *,** | **** |
| 12 ....... 2,4,7-tribromo-5,6-dichloro-benzimidazole | **** | **** | **** |
| 13 ....... 2,5,7-tribromo-4,6-dichloro-benzimidazole | **** | **** | **** |
| 14 ....... 2,4,6,7-tetrabromo-5-chloro-benzimidazole | **** | **** | **** |
| 15 ....... 2,4,5,6,7-pentabromo-benzimidazole | **** | **** | **** |
| 16 ....... chlorinated 2-chloro-benzimidazole (58.1% Cl) | **** | **** | **** |
| 17 ....... 2,4,5,6,7-pentachloro-benzimidazole | **** | **** | **** |
| 18 ....... 2,4,5,7-tetrachloro-benzimidazole | **** | **** | **** |
| 19 ....... 2,5,6-trichloro-4,7-dibromobenzimidazole | **** | **** | **** |

NOTES:
  *=Bad (>50% destruction).
  **=Medium (15–50% destruction).
  ***=Good (5–15% destruction).
  ****=Very good (<5% destruction).

The compounds of general Formula I can be used according to the usual methods for textile finishing. They have affinity to keratin material and are excellently suitable, therefore, for the protection of such materials from injury by insects, in particular they are suitable for the wash and light fast mothproofing of such materials both in the crude as well as in the processed state, for example of raw or processed sheep's wool as well as other animal hairs, fells and furs. In addition to the wash and light fast moth-proofing in the dyebath, the compounds can also be used for the impregnation of wool and woollen articles in dry cleaning processes, the materials then becoming equally excellently moth proofed.

In addition to their insecticidal action on the larvae of the clothes moth, the compounds of Formula I are also active against the larvae of the fur and carpet beetles. The textiles treated in any way with the compounds according to the invention such as woollen blankets, woollen carpets, woollen underwear, woollen clothes and knitted goods, are given protracted protection from the usual types of insects which are injurious to keratin material.

The agents used for the protection of keratin materials against injury by insects should contain the active substances of Formula I in a finely dispersed form. Thus, solutions, suspensions and emulsions of the active substances in particular are used.

As the compounds contain a hydrogen atom in the heterocyclic ring ($R_2$=H), in the form of their alkali metal salts they generally have good water solubility.

from injury caused by such pests are more closely described in the following examples. Parts are given therein as parts by weight and the temperatures are in degrees centigrade.

EXAMPLE 7

0.5 parts of 2,4,5,7-tetrachloro-benzimidazole are dissolved with the aid of 10 parts of 0.1 N sodium hydroxide solution and a little methanol in the form of the sodium salt. This solution is diluted with 3000 parts of water and 100 parts of wool are treated for 15 minutes in this liquor at 60°. 5 parts of 10% acetic are then added and the treatment is continued for another hour at 60°. The wool is then rinsed in the usual way and dried. On being tested, it proves to be resistant to attack by the larvae of moths, fur and carpet beetles.

EXAMPLE 8

The following process, for example, can be used for the application of 2,4,5,6,7-pentachloro-benzimidazole:

0.5 parts of active substance are dissolved in 10 parts of dimethyl formamide and the solution is poured into 3000 parts of water containing about 1–2 parts of an emulsifying agent, e.g. sulphated ricinus oil.

100 parts of wool are treated in this liquor at the boil for 30 minutes. After rinsing and drying, the wool proves to be moth proof.

Naturally, further auxiliaries as well as dyestuffs can be added to the treatment baths described in Examples 7 and 8.

We claim:
1. A compound selected from among a benzimidazole of the formula

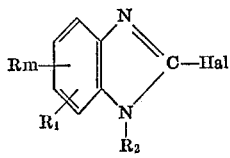

wherein

R is halogen, nitro, alkyl of up to 6 carbon atoms, alkoxy of up to 6 carbon atoms, trifluoromethyl, or lower alkyl-substituted amino, $R_1$ is benzoylamino, halogeno-benzoylamino, trifluoromethyl-benzoylamino, benzenesulfonylamino, halogeno benzenesulfonylamino, or loweralkylsulfonyl amino, $R_2$ is hydrogen or an alkali or alkaline earth metal cation, Hal is halogen with an atomic number of at most 35, and $m$ is a interger of from 1 to 3.

2. 2,4,5,7-tetrachloro-6-methoxy benzimidazole.
3. 2,5,6,7-tetracholor-4-methyl benzimidazole.

References Cited

Bednyagina et al.: Chem Abst., vol. 61, Column 8297 (1964).

Harrison et al.: Jour. Chem. Soc. (London), 1963, pages 2934–6 Relied on.

Harrison et al.: Jour Chem. Soc. (London), 1965, pages 236–9 (January 1965).

Knobloch et al.: Chem. Abstr., vol. 53, Column 3197 (1959).

Morgan: Jour. Chem. Soc. (London), 1961, pages 2344–5 relied on.

Ricci et al.: Chem. Abst., vol. 66, Abstract 1194526 (1967).

Zakhs, et al.: Chem. Abst., vol. 60, Columns 15857–8 (1964).

JOHN D. RANDOLPH, Primary Examiner

N. TROUSOF, Assistant Examiner

U.S. Cl. X.R.

106—15; 117—138.5; 252—8.8; 424—273